United States Patent
Miki

(10) Patent No.: US 9,594,094 B2
(45) Date of Patent: Mar. 14, 2017

(54) LATERAL FORCE ESTIMATION SYSTEM, METHOD OF ESTIMATING LATERAL FORCE AND VEHICLE

(71) Applicant: YAMAHA HATSUDOKI KABUSHIKI KAISHA, Iwata-shi, Shizuoka (JP)

(72) Inventor: Masayuki Miki, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 14/907,027

(22) PCT Filed: Mar. 6, 2015

(86) PCT No.: PCT/JP2015/001231
§ 371 (c)(1),
(2) Date: Jan. 22, 2016

(87) PCT Pub. No.: WO2015/159476
PCT Pub. Date: Oct. 22, 2015

(65) Prior Publication Data
US 2016/0161526 A1    Jun. 9, 2016

(30) Foreign Application Priority Data

Apr. 16, 2014 (JP) ................................. 2014-084827

(51) Int. Cl.
*G01P 15/14* (2013.01)
*G07C 5/02* (2006.01)
(Continued)

(52) U.S. Cl.
CPC .............. *G01P 15/14* (2013.01); *B60T 8/172* (2013.01); *B60T 8/1706* (2013.01);
(Continued)

(58) Field of Classification Search
CPC ...... G01P 15/14; G01P 15/0888; G01P 15/00; G01C 21/16; G01C 9/00; B60T 8/1706;
(Continued)

(56) References Cited

U.S. PATENT DOCUMENTS

2005/0209750 A1* 9/2005 Masamura ........... B60G 17/015
701/38
2010/0145576 A1* 6/2010 Doi ........................ B60L 11/00
701/41
(Continued)

FOREIGN PATENT DOCUMENTS

JP     11-006776 A    1/1999
JP     2004-051091 A  2/2004
(Continued)

OTHER PUBLICATIONS

Official Communication issued in International Application PCT/JP2015/001231, mailed on May 26, 2015.

*Primary Examiner* — Anne M Antonucci
(74) *Attorney, Agent, or Firm* — Keating and Bennett, LLP

(57) ABSTRACT

A ground surface position lateral acceleration calculator calculates ground surface position lateral acceleration based on lateral acceleration detected by an acceleration sensor, a yaw rate and a roll rate detected by a gyro sensor, yaw angular acceleration and roll angular acceleration calculated by an angular acceleration calculator, a roll angle calculated by a roll angle calculator, and specification information stored in a storage. A vehicle lateral force calculator calculates a vehicle lateral force based on the roll angular acceleration calculated by the angular acceleration calculator, the roll angle calculated by the roll angle calculator, the ground surface position lateral acceleration calculated by the ground
(Continued)

surface position lateral acceleration calculator and the specification information stored in the storage.

8 Claims, 14 Drawing Sheets

(51) Int. Cl.
| | |
|---|---|
| *B62J 99/00* | (2009.01) |
| *B60T 8/172* | (2006.01) |
| *B60T 8/1755* | (2006.01) |
| *B60W 40/10* | (2012.01) |
| *B62K 11/00* | (2006.01) |
| *G01C 9/00* | (2006.01) |
| *B60T 8/17* | (2006.01) |
| *G01C 21/16* | (2006.01) |
| *G01P 15/00* | (2006.01) |
| *G01P 15/08* | (2006.01) |

(52) U.S. Cl.
CPC ........ *B60T 8/1755* (2013.01); *B60T 8/17551* (2013.01); *B60W 40/10* (2013.01); *B62J 99/00* (2013.01); *B62K 11/00* (2013.01); *G01C 9/00* (2013.01); *G01C 21/16* (2013.01); *G07C 5/02* (2013.01); *B60T 2240/06* (2013.01); *B60W 2300/36* (2013.01); *B60W 2520/125* (2013.01); *B60W 2520/14* (2013.01); *B60W 2520/18* (2013.01); *B60Y 2200/12* (2013.01); *B62K 2207/02* (2013.01); *G01P 15/00* (2013.01); *G01P 15/0888* (2013.01)

(58) Field of Classification Search
CPC .... B60T 8/17551; B60T 8/1755; B60T 8/172; B60T 2204/06; B62K 11/00; B62K 2207/02; B60W 40/10; B60W 2520/125; B60W 2520/14; B60W 2520/18; B60W 2300/36; G07C 5/02; B62J 99/00
See application file for complete search history.

(56) References Cited

U.S. PATENT DOCUMENTS

| | | | |
|---|---|---|---|
| 2011/0172881 | A1 | 7/2011 | Seidel et al. |
| 2012/0259526 | A1 | 10/2012 | Inoue et al. |
| 2013/0299264 | A1 | 11/2013 | Araki et al. |

FOREIGN PATENT DOCUMENTS

| | | | |
|---|---|---|---|
| JP | 2006-240491 | A | 9/2006 |
| JP | 2008-087724 | A | 4/2008 |
| JP | 2011-063160 | A | 3/2011 |
| JP | 2011-128093 | A | 6/2011 |
| JP | 2011-520703 | A | 7/2011 |
| JP | 2012-076502 | A | 4/2012 |
| JP | 2012-153349 | A | 8/2012 |
| JP | 5007549 | B2 | 8/2012 |
| JP | 2012-171410 | A | 9/2012 |
| JP | 2013-256139 | A | 12/2013 |
| JP | 2014-091506 | A | 5/2014 |

* cited by examiner

LATERAL FORCE ESTIMATION SYSTEM, METHOD OF ESTIMATING LATERAL FORCE AND VEHICLE

BACKGROUND OF THE INVENTION

1. Field of the Invention

The present invention relates to a lateral force estimation system, a method of estimating a lateral force, and a vehicle including the lateral force estimation system.

2. Description of the Related Art

A lateral force of a wheel is required to be accurately estimated to control travelling of a vehicle. Regarding a four-wheeled automobile, a posture of a vehicle body during travelling is substantially constant, so that the lateral force is relatively easily and accurately estimated. On the one hand, regarding a vehicle that turns with a vehicle body being tilted with respect to a ground surface (a motorcycle, for example), forces in various directions are exerted on a wheel, so that it is difficult to accurately estimate the lateral force.

In JP 2006-240491 A, a method for calculating a lateral force actually exerted on a tire based on a lateral force of a tire generated by a roll angle (a camber thrust) is disclosed. Specifically, a relationship among a lateral slide angle of the tire, the roll angle (a camber angle), and the lateral force is measured in advance, and a camber thrust map is produced based on the results of the measurement. The camber thrust map shows a relationship among the roll angle, the lateral slide angle, and the camber thrust. The camber thrust is calculated using this camber thrust map. The lateral force actually exerted on the tire is calculated based on the calculated camber thrust.

However, the lateral slide angles of the tires are different from one another depending on the properties of the tires such as an air pressure and rubber properties. Therefore, when the tire properties change, accuracy of the calculated lateral force decreases. Further, when the roll angle is stably maintained during the travelling of the vehicle, a lateral force having a relatively high accuracy is acquired using the above-mentioned map. On the one hand, when a posture of a rider changes or the roll angle changes during the travelling of the vehicle, a lateral force having a high accuracy is not acquired even when the above-mentioned map is used.

SUMMARY OF THE INVENTION

Preferred embodiments of the present invention provide a lateral force estimation system, a method of estimating a lateral force, and a vehicle that accurately estimates the lateral force.

According to a preferred embodiment of the present invention, a lateral force estimation system provided in a vehicle that includes a plurality of wheels and turns in a tilted posture with respect to a ground surface includes a lateral acceleration detector that detects lateral acceleration at a predetermined position of the vehicle, a roll angular acceleration detector that detects roll angular acceleration of the vehicle, a yaw angular acceleration detector that detects yaw angular acceleration of the vehicle, a roll angle detector that detects a roll angle of the vehicle, a storage that stores a position of a center of gravity of the vehicle and a mass of the vehicle, a ground surface position lateral acceleration calculator that calculates acceleration exerted in a direction perpendicular or substantially perpendicular to a front-and-rear direction of the vehicle and parallel or substantially parallel to a ground surface at an intersection position of a straight line passing through a center of gravity of the vehicle and parallel or substantially parallel to a top-and-bottom direction of the vehicle with the ground surface as ground surface position lateral acceleration based on the lateral acceleration detected by the lateral acceleration detector, the roll angular acceleration detected by the roll angular acceleration detector, the yaw angular acceleration detected by the yaw angular acceleration detector, the roll angle detected by the roll angle detector, and the position of the center of gravity of the vehicle stored in the storage, and a vehicle lateral force calculator that calculates a sum of lateral forces exerted on the plurality of wheels as a vehicle lateral force based on the roll angle detected by the roll angle detector, the roll angular acceleration detected by the roll angular acceleration detector, the position of the center of gravity and mass of the vehicle stored in the storage, and the ground surface position lateral acceleration calculated by the ground surface position lateral acceleration calculator.

In this lateral force estimation system, the ground surface position lateral acceleration is calculated by the ground surface position lateral acceleration calculator based on the lateral acceleration, the roll angular acceleration, the yaw angular acceleration and the roll angle detected by the lateral acceleration detector, the roll angular acceleration detector, the yaw angular acceleration detector, and the roll angle detector, and the position of the center of gravity of the vehicle stored in the storage in advance. Further, the sum of the lateral forces exerted on the plurality of wheels is calculated as the vehicle lateral force based on the detected roll angle and roll angular acceleration, the stored position of the center of gravity and mass, and the calculated ground surface position lateral acceleration.

The ground surface position lateral acceleration is not influenced by the properties of the wheel such as the air pressure and rubber properties of the tire, and the posture of the rider. Further, the ground surface position lateral acceleration is based on dynamic conditions of the vehicle including the roll angular acceleration and the yaw angular acceleration. The vehicle lateral force is calculated using the ground surface position lateral acceleration, so that the vehicle lateral force is accurately estimated regardless of the properties of the wheel, the posture of the rider, and the dynamic conditions of the vehicle. Therefore, the travelling control of the vehicle is appropriately performed based on the estimated vehicle lateral force. Further, a special sensor, an expensive sensor or the like is not used, so that complications in the configuration and an increase of the cost are prevented.

When the roll angle is $\phi$, the roll angular acceleration is $\phi''$, a distance between the position of the center of gravity and the intersection position is h, the ground surface position lateral acceleration is Ay, and the vehicle lateral force is $F_{total}$, the vehicle lateral force calculator calculates a vehicle lateral force $F_{total}$ using a following formula (1).

$$F_{total} = m \cdot Ay + m \cdot h \cdot \phi'' / \cos \phi \quad (1)$$

In this case, the vehicle lateral force is easily calculated with a simple configuration.

The lateral force estimation system preferably further includes a steering angle detector that detects a steering angle of the vehicle, wherein the vehicle lateral force calculator corrects a calculated vehicle lateral force based on the steering angle detected by the steering angle detector.

In this case, the vehicle lateral force is accurately estimated based on the steering angle of the vehicle. In particular, when the vehicle turns with the braking force or the driving force being exerted on the steering wheel, the accuracy of the calculated vehicle lateral force is improved.

The lateral force estimation system preferably further includes a load calculator that calculates a load applied from each wheel to the ground surface, and a lateral force calculator that calculates a lateral force exerted on each wheel based on the yaw angular acceleration detected by the yaw angular acceleration detector, the vehicle lateral force calculated by the vehicle lateral force calculator, and the load calculated by the load calculator.

In this case, the lateral force of each wheel is accurately estimated with a simple configuration. Further, the travelling control of the vehicle is appropriately performed based on the estimated lateral force of each wheel.

The vehicle lateral force calculator preferably sets the vehicle lateral force to 0 when the roll angle detected by the roll angle detector is not in a predetermined range.

In this case, unnecessary travelling control is prevented from being performed when the vehicle is falling.

The vehicle lateral force calculator preferably periodically calculates the vehicle lateral force, and maintains the vehicle lateral force calculated in a previous period when the roll angle detected by the roll angle detector is not in a predetermined range.

In this case, unnecessary travelling control is prevented from being performed when the vehicle is falling.

According to another preferred embodiment of the present invention, a method of estimating a lateral force exerted on a vehicle that includes a plurality of wheels and turns in a tilted posture with respect to a ground surface includes the steps of storing a position of a center of gravity of the vehicle and a mass of the vehicle, detecting lateral acceleration at a predetermined position of the vehicle, detecting roll angular acceleration of the vehicle, detecting yaw angular acceleration of the vehicle, detecting a roll angle of the vehicle, calculating acceleration exerted in a direction perpendicular or substantially perpendicular to a front-and-rear direction of the vehicle and parallel or substantially parallel to a ground surface at an intersection position of a straight line passing through a center of gravity of the vehicle and parallel or substantially parallel to a top-and-bottom direction of the vehicle with the ground surface as ground surface position lateral acceleration based on the detected lateral acceleration, roll angular acceleration, yaw angular acceleration and roll angle, and the stored position of the center of gravity of the vehicle, and calculating a sum of the lateral forces exerted on the plurality of wheels as a vehicle lateral force based on the detected roll angle and roll angular acceleration, the stored position of the center of gravity and mass of the vehicle, and the calculated ground surface position lateral acceleration.

In this lateral force estimation method, the ground surface position lateral acceleration is calculated based on the detected lateral acceleration, roll angular acceleration, yaw angular acceleration and roll angle, and the stored position of the center of gravity of the vehicle. Further, the sum of the lateral forces exerted on the plurality of wheels is calculated as the vehicle lateral force based on the detected roll angle and roll angular acceleration, the stored position of the center of gravity and mass, and the calculated ground surface position lateral acceleration.

The ground surface position lateral acceleration is not influenced by the properties of the wheel such as the air pressure and rubber properties of the tire, and the posture of the rider. Further, the ground surface position lateral acceleration is based on the dynamic conditions of the vehicle including the roll angular acceleration and the yaw angular acceleration. The vehicle lateral force is calculated using the ground surface position lateral acceleration, so that the vehicle lateral force is accurately estimated regardless of the properties of the wheel, the posture of the rider, and the dynamic conditions of the vehicle. Therefore, the travelling control of the vehicle is appropriately performed based on the estimated vehicle lateral force. Further, a special sensor, an expensive sensor or the like is not used, so that the complications in the configuration and an increase of the cost are prevented.

According to yet another preferred embodiment of the present invention, a vehicle includes a main body that includes a plurality of wheels, a motor that generates a driving force to move the main body, and the lateral force estimation system according to one of the preferred embodiments of the present invention described above.

In this vehicle, the drive wheel is rotated by the motive power generated by the motor. Thus, the main body is moved. In this case, the vehicle lateral force is accurately estimated by the lateral force estimation system according to the above-described preferred embodiments. The travelling control of the vehicle is appropriately performed based on the estimated vehicle lateral force.

Various preferred embodiments of the present invention cause the lateral force to be accurately estimated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A lateral force estimation system, a method of estimating a lateral force, and a vehicle according to preferred embodiments of the present invention will be described below with reference to drawings. The following description relates to a motorcycle as one example of the vehicle.

Figure 1:
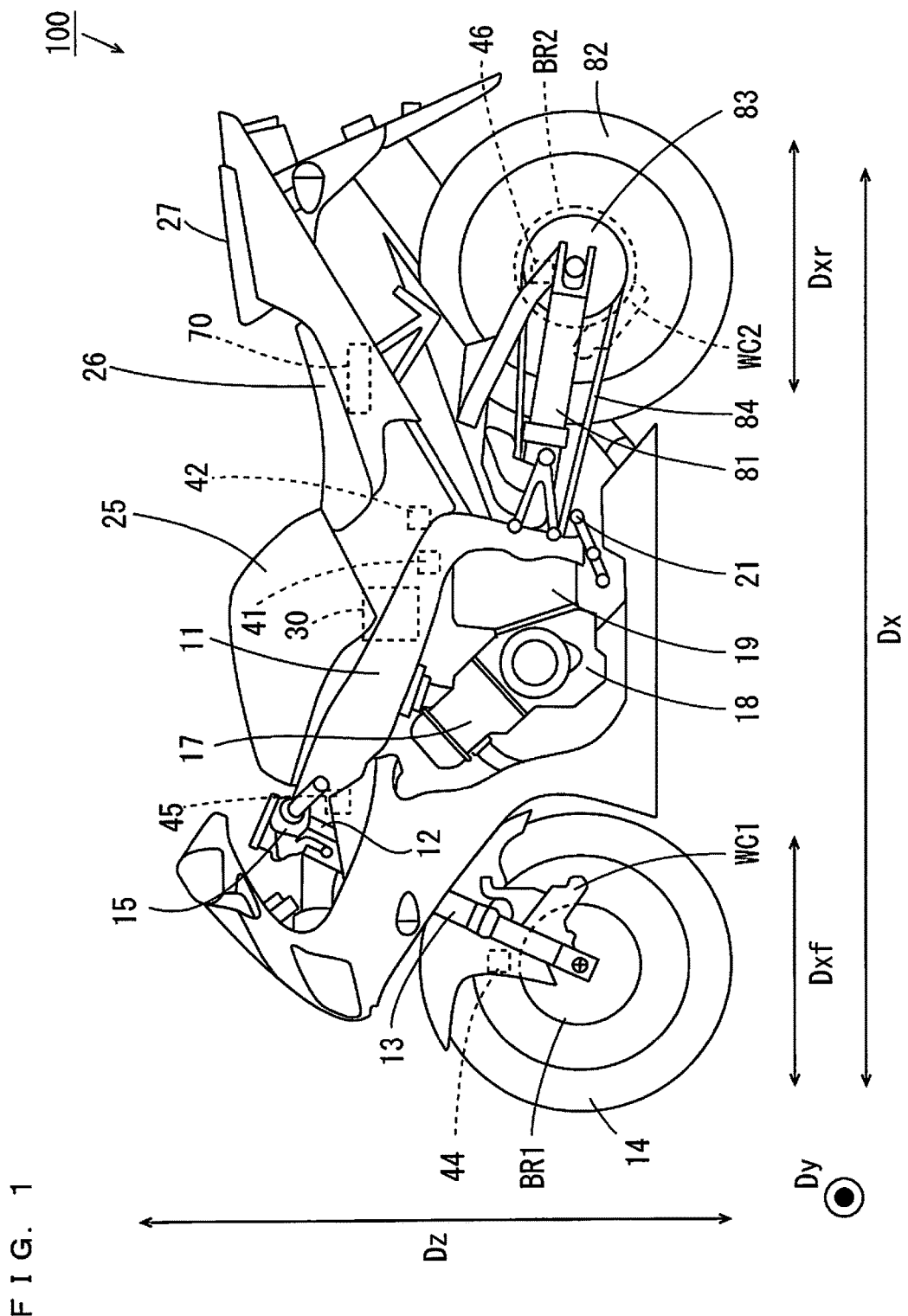
FIG. 1 is a schematic side view of a motorcycle according to a preferred embodiment of the present invention.

FIG. 1 is a schematic side view of the motorcycle according to a preferred embodiment of the present invention. In the motorcycle 100 of FIG. 1, a head pipe 12 is provided at the front end of a body frame 11. A front fork 13 is provided at the head pipe 12 to be swingable in a left-and-right direction. A front wheel 14 and a brake rotor BR1 are rotatably supported at the lower end of the front fork 13. Further, a wheel cylinder WC1 and a front wheel speed sensor 44 are fixed in the vicinity of the lower end of the front fork 13. The brake rotor BR1 includes one or a plurality of discs (not shown). The wheel cylinder WC1 is incorporated in a brake caliper together with a brake pad (not shown) pressed against the disc of the brake rotor BR1 during braking of the front wheel 14. A front wheel speed sensor 44 detects a rotation speed of the front wheel 14.

A handle 15 is provided at the upper end of the head pipe 12. A steering angle sensor 45 is provided in the vicinity of the head pipe 12. The steering angle sensor 45 detects a steering angle of the motorcycle 100. The steering angle is an angle of a steering wheel (the front wheel 14 in the present example) with respect to the body frame 11 (see FIG. 12, described below).

An engine 17 is provided at a center portion of the body frame 11. A crankcase 18 is provided at a lower portion of the engine 17. A transmission case 19 is coupled to a rear portion of the crankcase 18. The transmission case 19 is located below the body frame 11. A shift pedal 21 is provided at a left side portion of the transmission case 19.

A rear arm 81 is connected to the body frame 11 to extend rearward of the transmission case 19. A rear wheel 82, a rear wheel driven sprocket 83 and a brake rotor BR2 are rotatably supported at the rear end of the rear arm 81. A chain 84 is attached to the rear wheel driven sprocket 83. A wheel cylinder WC2 and a rear wheel speed sensor 46 are fixed in the vicinity of the rear end of the rear arm 81. A brake rotor BR2 includes one or a plurality of discs (not shown). The wheel cylinder WC2 is incorporated in a brake caliper together with a brake pad (not shown) pressed against the disc of the brake rotor BR2 during braking of the rear wheel 82. The rear wheel speed sensor 46 detects a rotation speed of the rear wheel 82.

A fuel tank 25 is provided above the engine 17, and two seats 26, 27 are provided behind the fuel tank 25 and extend in a front-and-rear direction. A hydraulic pressure controller 30, a gyro sensor 41, an acceleration sensor 42, and a controller 70 are provided below the fuel tank 25 and the two seats 26, 27. The gyro sensor 41 detects a yaw rate (a yaw angular speed) and a roll rate (a roll angular speed) of the motorcycle 100. The acceleration sensor 42 detects lateral acceleration generated in a lateral direction (a vehicle lateral direction Dy, described below) and longitudinal acceleration generated in the front-and-rear direction (a vehicle front-and-rear direction Dx, described below). Details of the hydraulic pressure controller 30 and the controller 70 will be described below.

Figure 2:
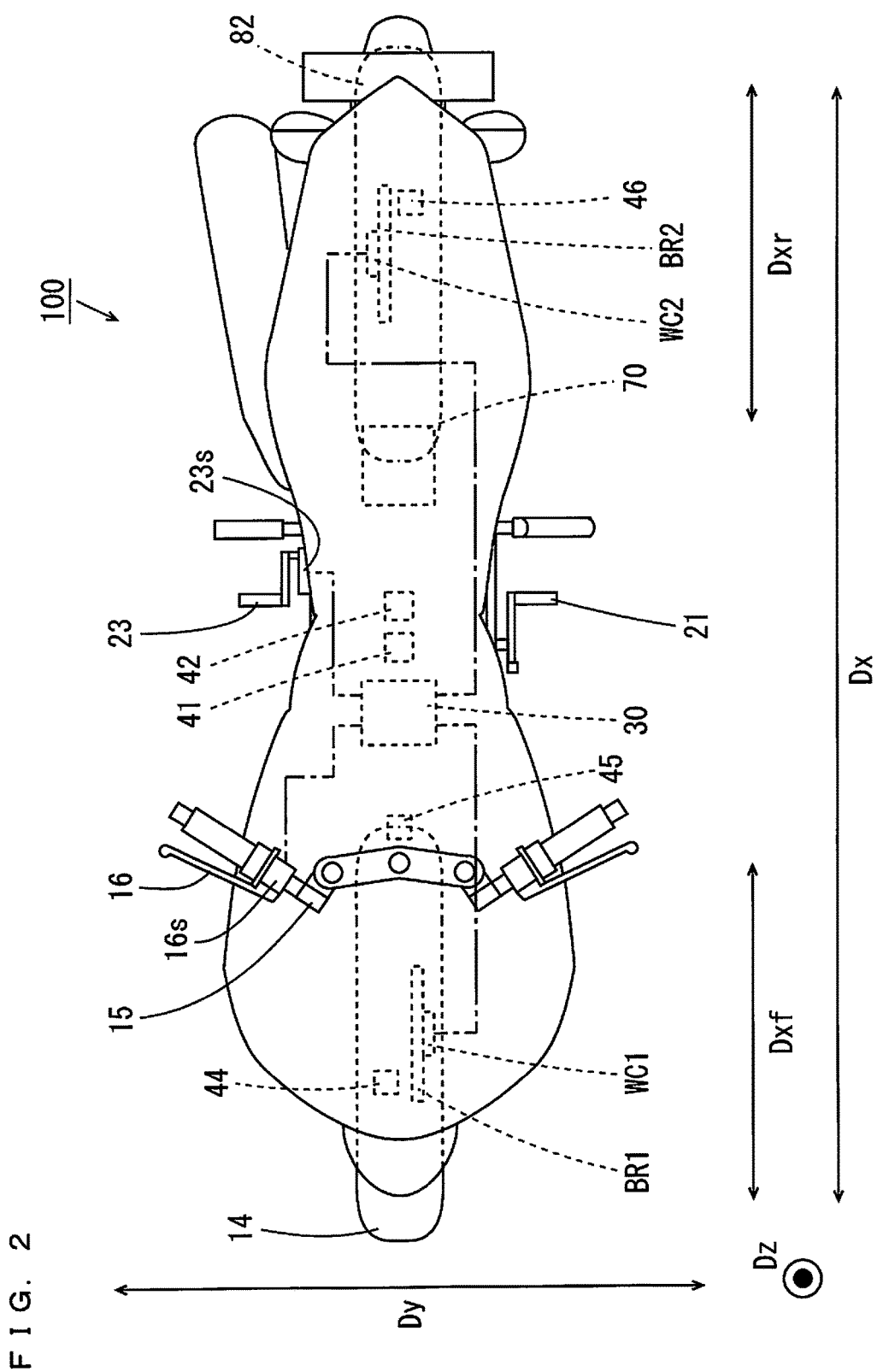
FIG. 2 is a schematic plan view of the motorcycle of FIG. 1.

FIG. 2 is a schematic plan view of the motorcycle 100 of FIG. 1. In FIG. 2, a portion of the constituent elements of the motorcycle 100 are shown together with an outer shape of the motorcycle 100 of FIG. 1. As shown in FIG. 2, a brake lever 16 and a front wheel master cylinder 16s are provided at a right side portion of the handle 15. Further, a brake pedal 23 and a rear wheel master cylinder 23s are provided at a right side portion of the transmission case 19 (FIG. 1).

The hydraulic pressure controller 30 is connected to the front wheel master cylinder 16s, the rear wheel master cylinder 23s, and the wheel cylinders WC1, WC2. The brake lever 16 is operated so that a hydraulic pressure is supplied from the front wheel master cylinder 16s to the hydraulic pressure controller 30, and a hydraulic pressure is supplied from the hydraulic pressure controller 30 to the wheel cylinder WC1. The brake pad is pressed against the brake rotor BR1 by the wheel cylinder WC1, so that the braking force is exerted on the front wheel 14. Further, the brake pedal 23 is operated so that a hydraulic pressure is supplied from the rear wheel master cylinder 23s to the hydraulic pressure controller 30, and the hydraulic pressure is supplied from the hydraulic pressure controller 30 to the wheel cylinder WC2. The brake pad is pressed against the brake rotor BR2 by the wheel cylinder WC2, so that the braking force is exerted on the rear wheel 82.

The hydraulic pressure controller 30 adjusts a braking force exerted on the front wheel 14 by adjusting the hydraulic pressure to the wheel cylinder WC1, and adjusts a braking force exerted on the rear wheel 82 by adjusting the hydraulic pressure to the wheel cylinder WC2.

The hydraulic pressures of the front wheel master cylinder 16s and the rear wheel master cylinder 23s are preferably detected by a sensor without connection of the front wheel master cylinder 16s and the rear wheel master cylinder 23s to the hydraulic pressure controller 30, and the hydraulic pressures from the hydraulic pressure controller 30 to the wheel cylinders WC1, WC2 are preferably adjusted based on their detection results.

The controller 70 includes a CPU (Central Processing Unit), a ROM (Read on Memory), and a RAM (Random Access Memory). Detection results acquired by the front wheel speed sensor 44, the steering angle sensor 45, the rear wheel speed sensor 46, the gyro sensor 41 and the acceleration sensor 42, described above, are supplied to the CPU of the controller 70. The CPU estimates the lateral forces of the front wheel 14 and the rear wheel 82 based on these detection results and controls the hydraulic pressure controller 30 based on the estimated lateral forces. Further, the CPU controls a basic operation of the engine 17 of FIG. 1. The ROM stores a control program of the CPU and the like. The RAM stores various data and functions as a processing area for the CPU.

In the present preferred embodiment, the lateral force estimation system includes the gyro sensor 41, the acceleration sensor 42, and the controller 70. The gyro sensor 41, the acceleration sensor 42, and the controller 70 may be respectively arranged at positions different from one another or may be provided in a common casing.

In the following description, a direction parallel or substantially parallel to a central plane (a symmetry plane) of the body frame 11 of FIG. 1 and also parallel or substantially parallel to a ground surface is referred to as the vehicle front-and-rear direction Dx, a direction perpendicular or substantially perpendicular to the central plane of the body frame 11 is referred to as a vehicle lateral direction Dy, and a direction perpendicular or substantially perpendicular to the vehicle front-and-rear direction Dx and the vehicle lateral direction Dy is referred to as a vehicle top-and-bottom direction Dz.

Further, a direction parallel or substantially parallel to a central plane of the front wheel 14 and parallel or substantially parallel to a ground surface is referred to as a front wheel front-and-rear direction Dxf, and a direction parallel or substantially parallel to a central plane of the rear wheel 82 and parallel or substantially parallel to the ground surface is referred to as a rear wheel front-and-rear direction Dxr. When the steering angle is 0°, the front wheel front-and-rear direction Dxf coincides with the vehicle front-and-rear direction Dx. The rear wheel front-and-rear direction Dxr coincides with the vehicle front-and-rear direction Dx.

Figure 3:
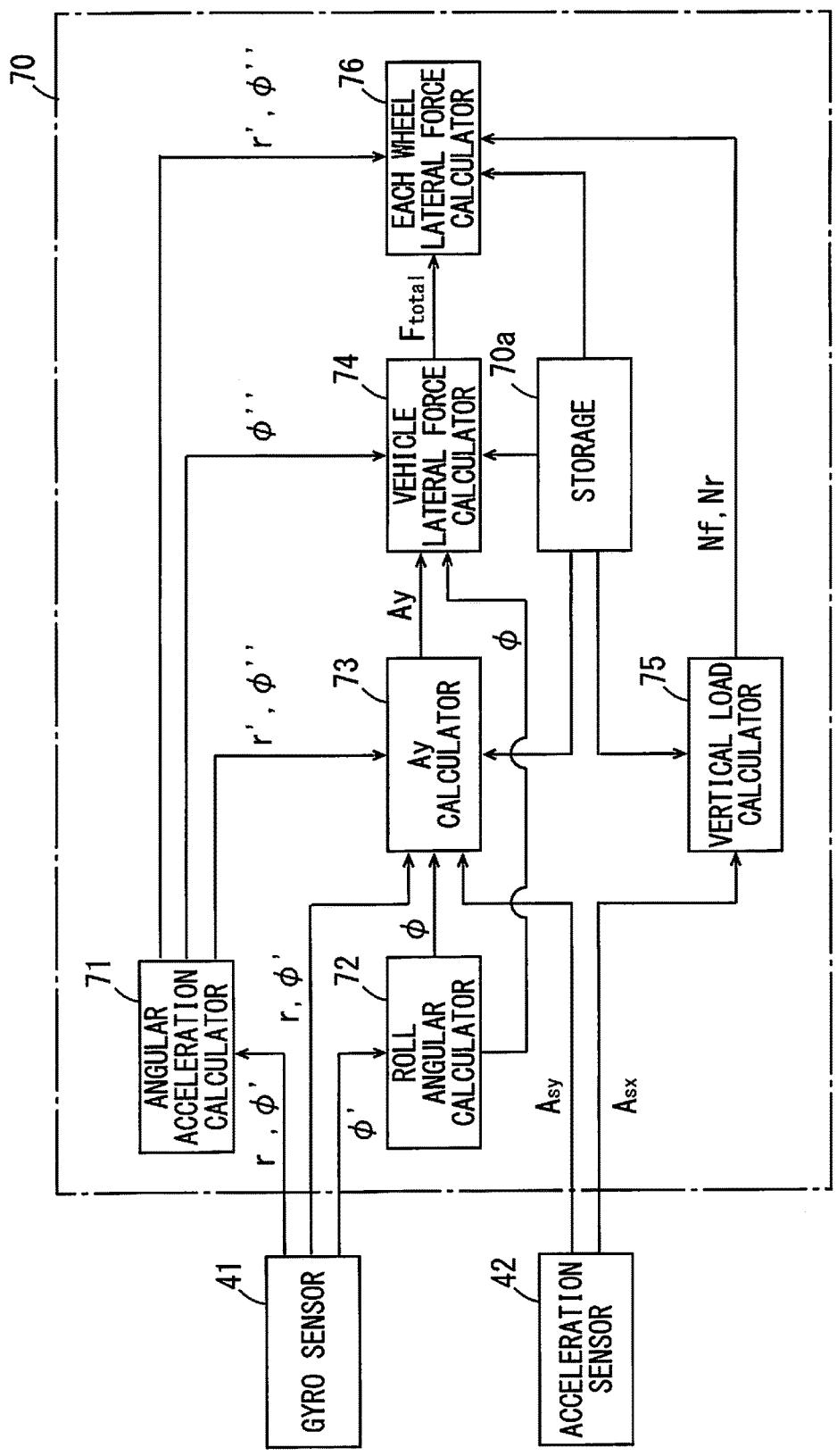
FIG. 3 is a block diagram for explaining a configuration of a lateral force estimation system.

FIG. 3 is a block diagram for explaining a configuration of the lateral force estimation system. As shown in FIG. 3, the controller 70 performs the functions of an angular acceleration calculator 71, a roll angle calculator 72, an Ay calculator 73, a vehicle lateral force calculator 74, a vertical load calculator 75 and each wheel lateral force calculator 76. While these functions preferably are performed by the CPU and the controller program in the present example, at least a portion of these functions may be performed by hardware such as an electric circuit.

The controller 70 includes a storage 70a. The storage 70a may be the above-mentioned ROM or may be another storage element or a storage such as a flash memory or a hard disc. Specification information of the motorcycle 100 is stored in the storage 70a. The specification information includes a mass, a dimension, a position of a center of gravity and the like.

The angular acceleration calculator 71 calculates yaw angle acceleration r' based on a yaw rate r detected by the gyro sensor 41, and calculates roll angular acceleration $\phi''$ based on a roll rate $\phi'$ detected by the gyro sensor 41. The roll angle calculator 72 calculates a roll angle $\phi$ based on the roll rate $\phi'$ detected by the gyro sensor 41. The roll angle $\phi$ is an angle of tilting of the motorcycle 100 with respect to the ground surface (see FIG. 7, described below).

The Ay calculator 73 calculates ground surface position lateral acceleration Ay based on the lateral acceleration $A_{sy}$ detected by the acceleration sensor 42, the yaw rate r and the roll rate $\phi'$ detected by the gyro sensor 41, the yaw angular acceleration r' and the roll angular acceleration $\phi''$ calculated by the angular acceleration calculator 71, the roll angle $\phi$ calculated by the roll angle calculator 72, and the specification information stored in the storage 70a. Details of the ground surface position lateral acceleration Ay will be described below.

The vehicle lateral force calculator 74 calculates a vehicle lateral force $F_{total}$ that is a resultant force of a lateral force of the front wheel 14 and a lateral force of the rear wheel 82 based on the roll angular acceleration $\phi''$ calculated by the angular acceleration calculator 71, the roll angle $\phi$ calculated by the roll angle calculator 72, the ground surface position lateral acceleration Ay calculated by the Ay calculator 73, and the specification information stored in the storage 70a.

The lateral force of the front wheel 14 is a force applied from the ground surface to the front wheel 14 and exerted in a direction perpendicular or substantially perpendicular to the front wheel front-and-rear direction Dxf (FIG. 1) and parallel or substantially parallel to the ground surface. The lateral force of the rear wheel 82 is a force applied from the ground surface to the rear wheel 82 and a force exerted in a direction perpendicular or substantially perpendicular to the rear wheel front-and-rear direction Dxr (FIG. 1) and parallel or substantially parallel to the ground surface. Details of the vehicle lateral force $F_{total}$ will be described below.

The vertical load calculator 75 respectively calculates a vertical load Nf applied from the front wheel 14 to the ground surface and a vertical load Nr applied from the rear wheel 82 to the ground surface based on the longitudinal acceleration $A_{sx}$ detected by the acceleration sensor 42 and the specification information stored in the storage 70a.

Each wheel lateral force calculator 76 calculates each of the lateral force of the front wheel 14 and the lateral force of the rear wheel 82 based on the yaw angular acceleration r' and the roll angular acceleration $\phi''$ calculated by the angular acceleration calculator 71, the vehicle lateral force $F_{total}$ calculated by the vehicle lateral force calculator 74, vertical loads Nf, Nr calculated by the vertical load calculator 75 and the specification information stored in the storage 70a.

Figure 4:
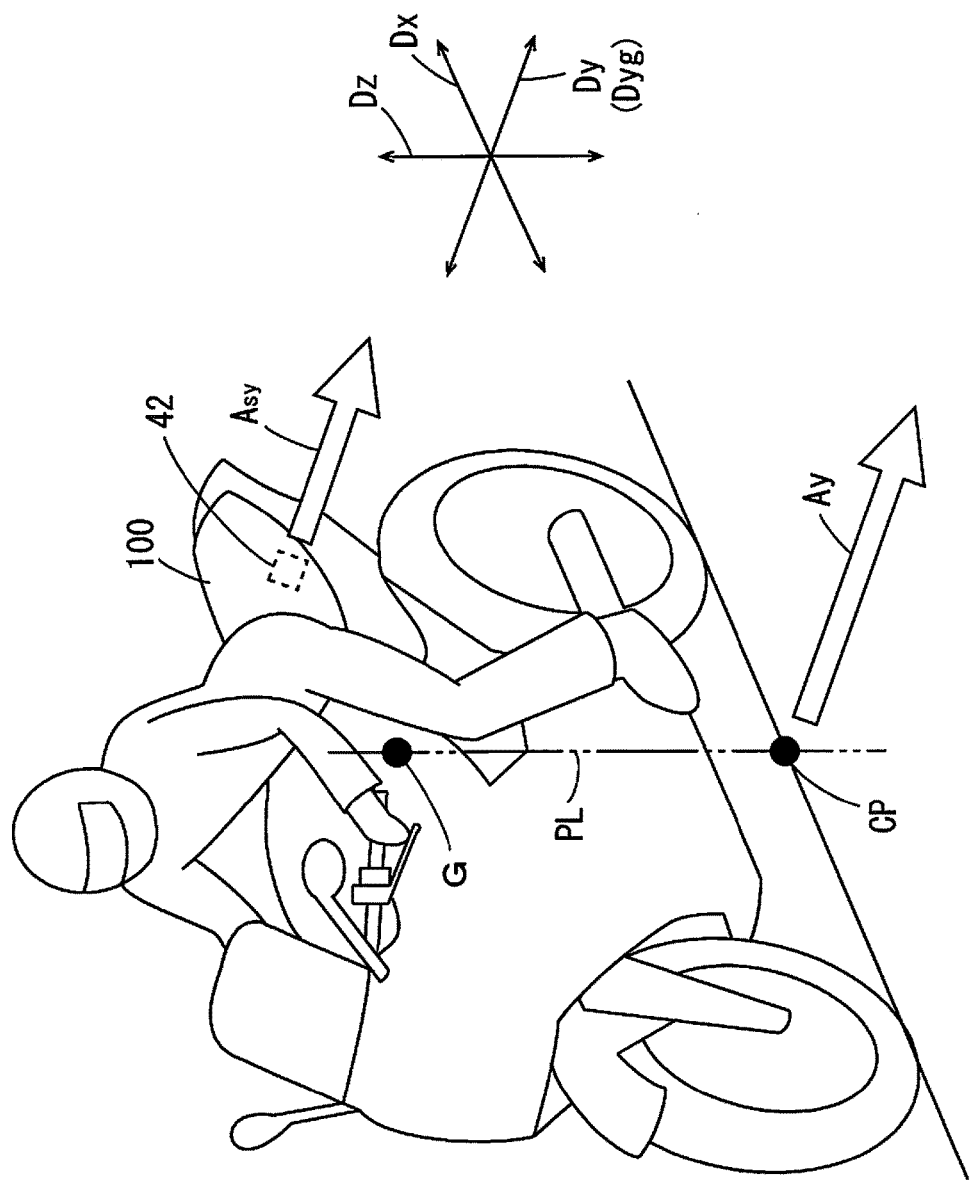
FIG. 4 is an external perspective view for explaining ground surface position lateral acceleration.
Figure 5:
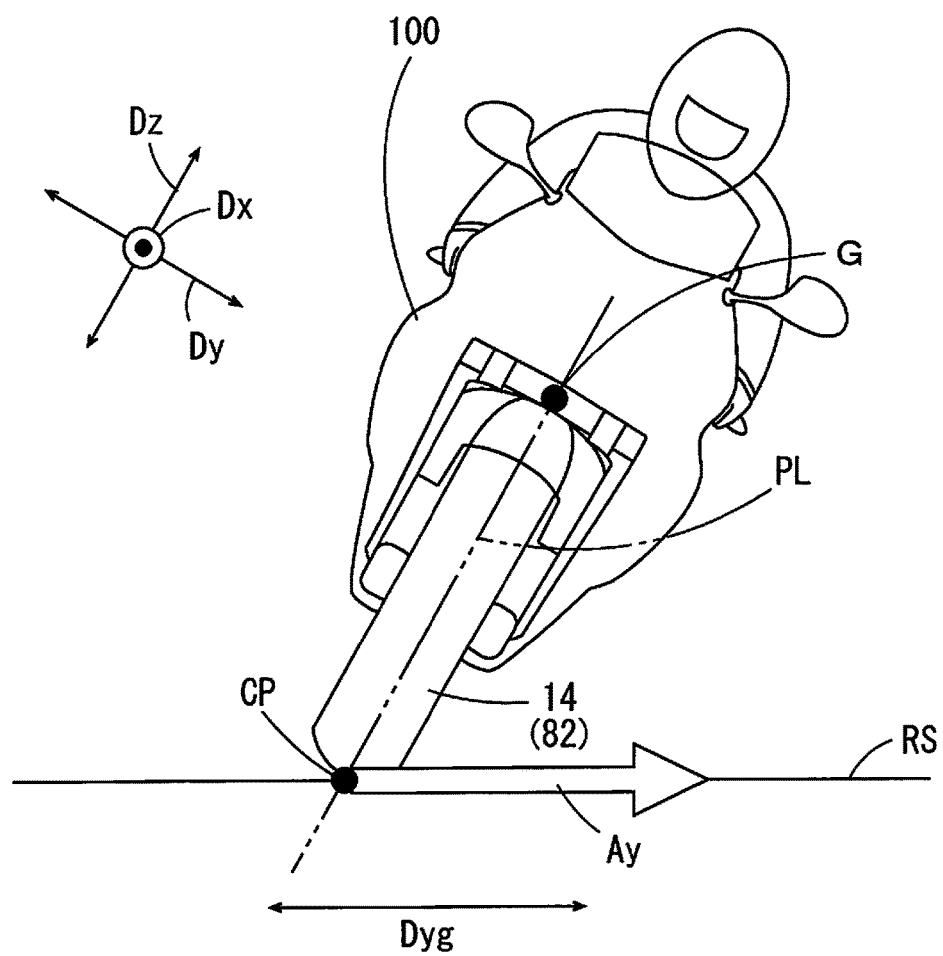
FIG. 5 is a schematic plan view for explaining the ground surface position lateral acceleration.

FIGS. 4 and 5 are an external perspective view and a front view for explaining the ground surface position lateral acceleration Ay. In the following description, a direction perpendicular or substantially perpendicular to the vehicle front-and-rear direction Dx and parallel or substantially parallel to the ground surface is referred to as a ground surface lateral direction Dyg. As shown in FIG. 4, when the roll angle $\phi$ is 0°, the ground surface lateral direction Dyg coincides with the vehicle lateral direction Dy. On the one hand, as shown in FIG. 5, when the roll angle $\phi$ is not 0°, the ground surface lateral direction Dyg does not coincide with the vehicle lateral direction Dy.

In FIGS. 4 and 5, a straight line PL passing through a center of gravity G of the motorcycle 100 and parallel or substantially parallel to the vehicle top-and-bottom direction Dz intersects with the ground surface at an intersection position CP. The acceleration in the ground surface lateral direction Dyg at the intersection position CP is the ground surface position lateral acceleration Ay.

The lateral acceleration $A_{sy}$ detected by the acceleration sensor 42 is the lateral acceleration at a position of the acceleration sensor 42 and is different from the ground surface position lateral acceleration Ay. A positional relationship between the position of the acceleration sensor 42 and the intersection position CP is constant. The positional relationship is stored in the storage 70a of FIG. 3 in advance as the specification information. The Ay calculator 73 of FIG. 3 converts the lateral acceleration $A_{sy}$ into the ground surface position lateral acceleration Ay based on the positional relationship stored in the storage 70a. Specifically, the ground surface position lateral acceleration Ay is calculated based on the lateral acceleration $A_{sy}$, the positional relationship between the position of the acceleration sensor 42 and the intersection position CP, the roll angle $\phi$, the yaw rate r, the roll rate $\phi'$, the yaw angular acceleration r' and the roll angular acceleration $\phi''$.

Figure 6:
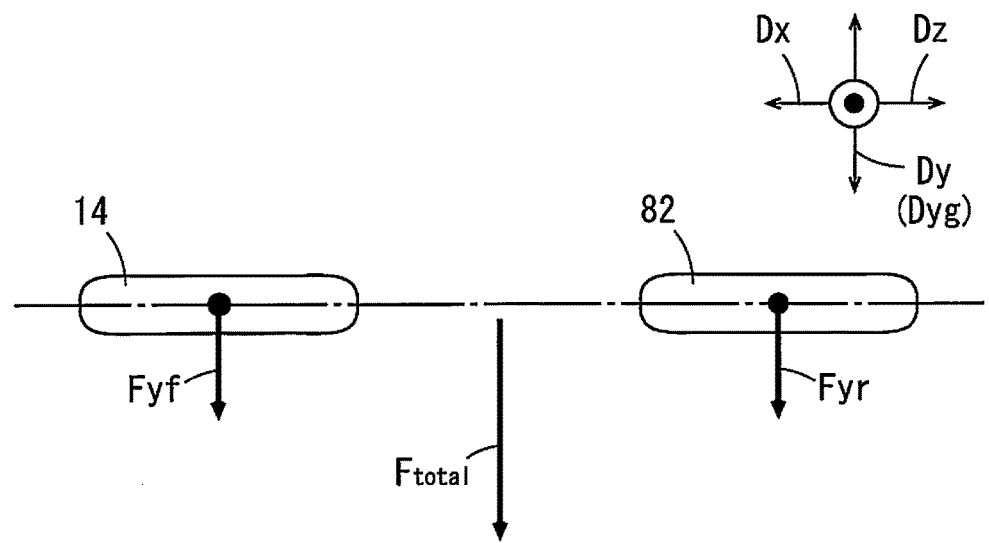
FIG. 6 is a schematic plan view for explaining a vehicle lateral force.

FIG. 6 is a schematic plan view for explaining the vehicle lateral force $F_{total}$. The vehicle lateral force $F_{total}$ is a sum of components of the lateral forces of the front wheel 14 and the rear wheel 82 exerted in the ground surface lateral direction Dyg. In FIG. 6, the lateral force of the front wheel 14 is Fyf, the lateral force of the rear wheel 82 is Fyr, and the steering angle is 0°. In this case, as expressed in a following formula (1), the vehicle lateral force $F_{total}$ is the sum of the lateral force Fyf of the front wheel 14 and the lateral force Fyr of the rear wheel 82.

$$F_{total} = FYf + FYr \tag{1}$$

Figure 7:
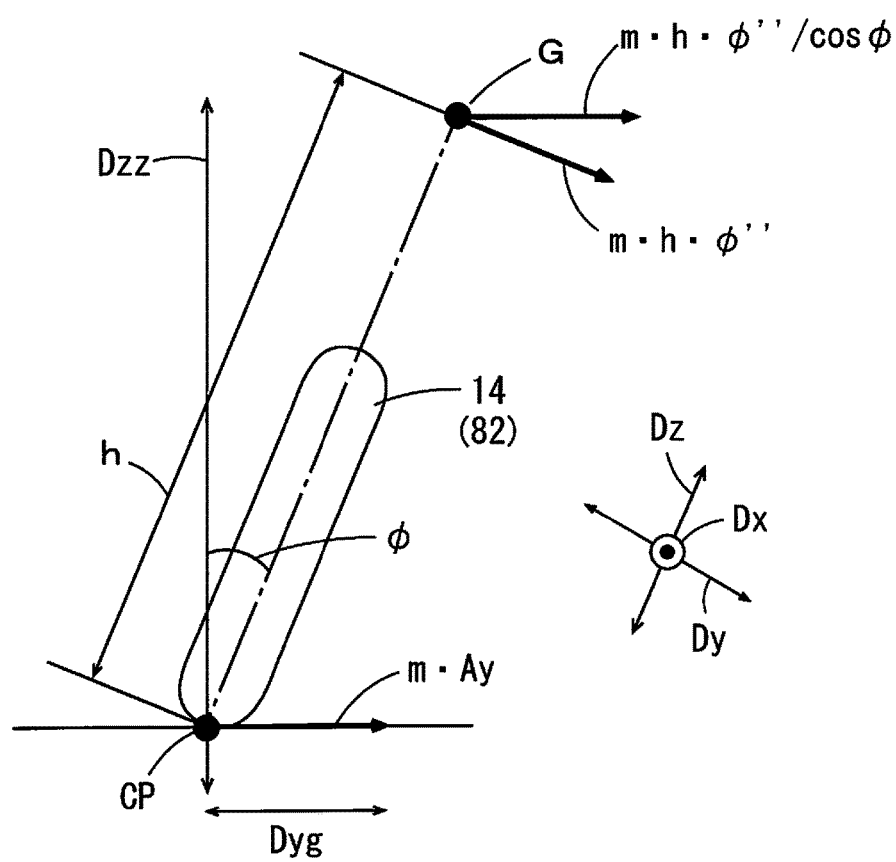
FIG. 7 is a schematic plan view for explaining a force exerted on a center of gravity and an intersection position.

FIG. 7 is a schematic front view for explaining a force exerted on the center of gravity G and the intersection position CP. In FIG. 7, the roll angle of the motorcycle 100 is $\phi$, and the roll angular acceleration is $\phi'$. The roll angle $\phi$ is equivalent to an angle defined by the vehicle top-and-bottom direction Dz and a direction Dzz vertical to the ground surface. A distance between the center of gravity G and the intersection position CP (see FIGS. 4 and 5) is h. The distance his stored in the storage 70a of FIG. 3 in advance as the specification information.

A roll moment exerted in the vehicle lateral direction Dy at the center of gravity G is indicated by m·h·$\phi''$. m is a mass of the motorcycle 100 and is stored in the storage 70a of FIG. 3 in advance as the specification information. A force in the ground surface lateral direction Dyg exerted on the center of gravity G is indicated by m·h·φ/cos φ. Further, a force in the ground surface lateral direction Dyg exerted on the intersection position CP is indicated by m·Ay. A following formula (2) holds as a relationship among the forces exerted in the ground surface lateral direction Dyg.

$$F_{total}=m\cdot Ay+m\cdot h\cdot \phi''/\cos \phi \qquad (2)$$

The vehicle lateral force calculator 74 of FIG. 3 calculates the vehicle lateral force $F_{total}$ based on the formula (2).

Figure 8:
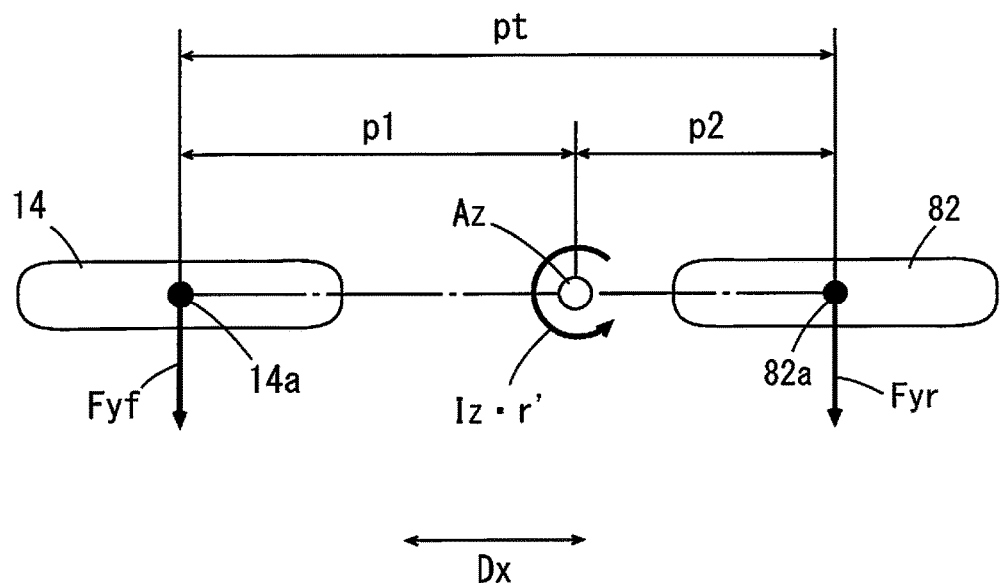
FIG. 8 is a diagram for explaining a yaw moment exerted on the motorcycle.

A yaw moment is exerted on the motorcycle 100 due to a difference between the force in the ground surface lateral direction Dyg exerted on the front wheel 14 and the force in the ground surface lateral direction Dyg exerted on the rear wheel 82. FIG. 8 is a diagram for explaining the yaw moment exerted on the motorcycle 100. In the example of FIG. 8, the steering angle is 0°. As shown in FIG. 8, the yaw moment is exerted on the motorcycle 100 about an axis Az vertical to the ground surface. A relationship between the yaw moment, and the forces exerted on the front wheel 14 and the rear wheel 82 is expressed by a following formula (3).

$$Iz\cdot r'=p1\cdot Fyf-p2\cdot Fyr \qquad (3)$$

In the formula (3), Iz is an inertia of the motorcycle 100 and is stored in the storage 70a of FIG. 3 in advance as the specification information. The yaw moment is indicated by Iz·r'.

p1 is a distance in the vehicle front-and-rear direction Dx between the axis Az and the rotation shaft 14a of the front wheel 14, and p2 is a distance in the vehicle front-and-rear direction Dx between the axis Az and the rotation axis 82a of the rear wheel 82. The sum of the distances p1, p2 coincides with a distance (the wheelbase) pt between the rotation shaft of the front wheel 14 and the rotation shaft of the rear wheel 82. A position of the axis Az changes due to the acceleration and deceleration of the motorcycle 100.

Figure 9:
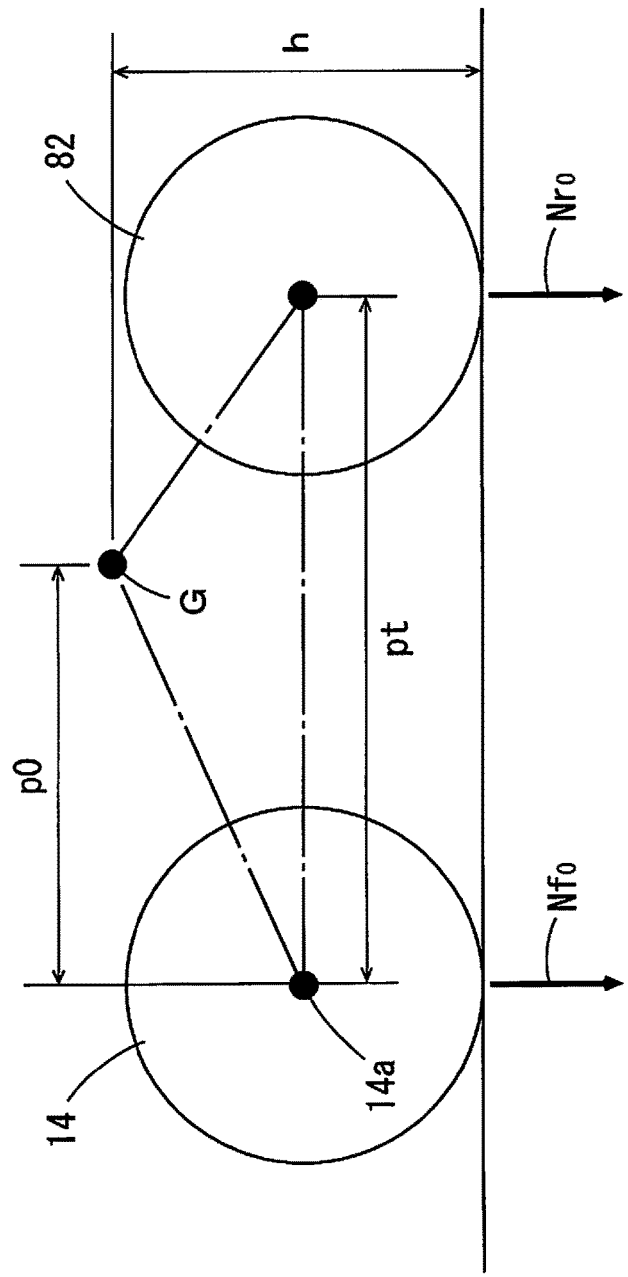
FIG. 9 is a diagram for explaining vertical loads of a front wheel and a rear wheel.
Figure 10:
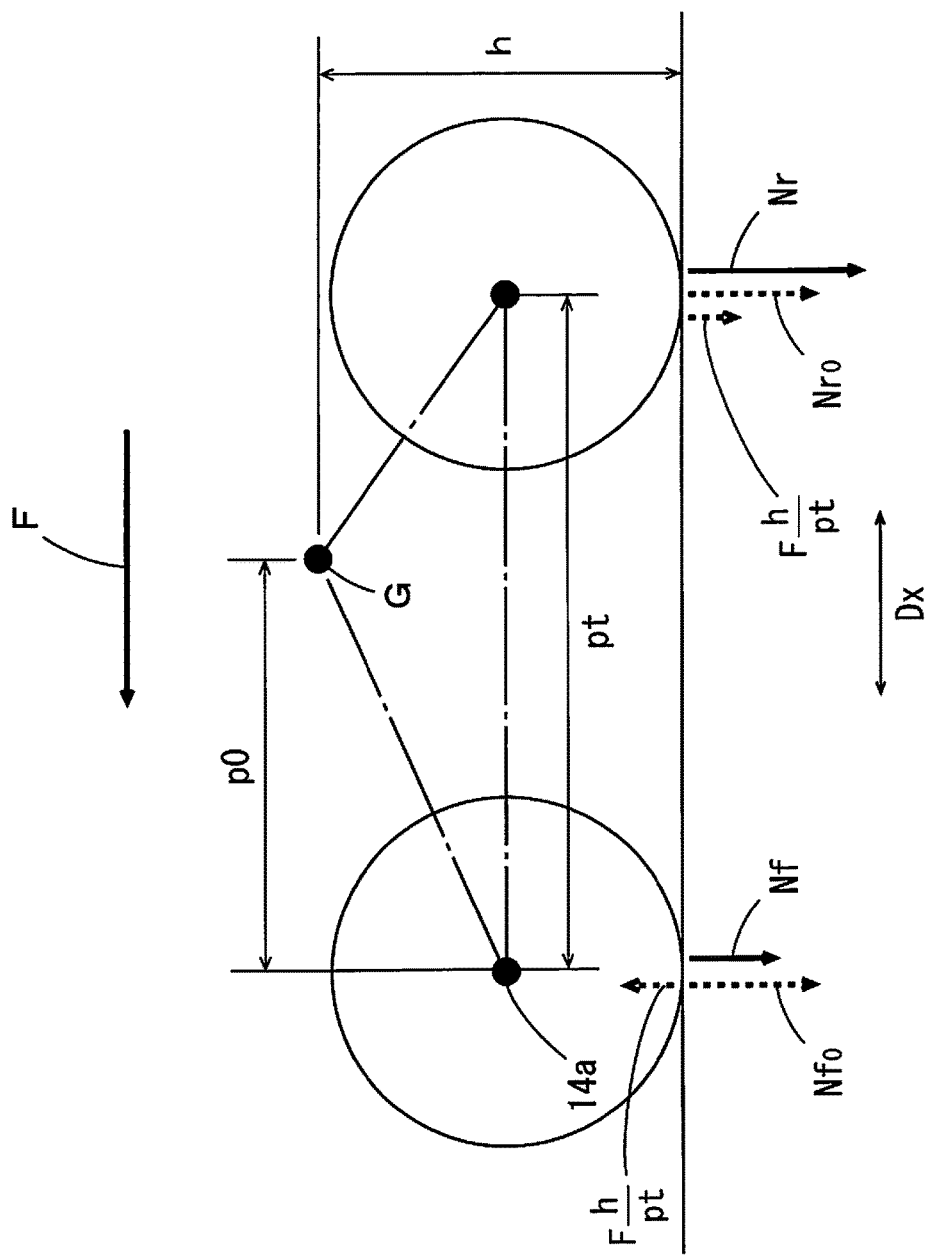
FIG. 10 is a diagram for explaining the vertical loads of the front wheel and the rear wheel.

The distances p1, p2 are determined from vertical loads of the front wheel 14 and the rear wheel 82. FIGS. 9 and 10 are diagrams for explaining the vertical loads of the front wheel 14 and the rear wheel 82. FIG. 9 shows the vertical loads of the front wheel 14 and the rear wheel 82 of when the motorcycle 100 is stopped. FIG. 10 shows the vertical loads of the front wheel 14 and the rear wheel 82 of when the motorcycle 100 is travelling.

As shown in FIG. 9, when the motorcycle 100 is stopped, the vertical load $Nf_0$ is applied from the front wheel 14 to the ground surface, and the vertical load $Nr_0$ is applied from the rear wheel 82 to the ground surface. The vertical load $Nf_0$ is expressed by a following formula (4), and the vertical load $Nr_0$ is expressed by a following formula (5).

$$Nf_0=m\cdot g\cdot p0/pt \qquad (4)$$

$$Nr_0=m\cdot g\cdot (pt-p0)/pt \qquad (5)$$

In the formula (4) and the formula (5), g is gravitational acceleration, p0 is a distance between the center of gravity G and the rotation shaft 14a of the front wheel 14, and pt is the wheelbase. The wheelbase pt and the vertical loads $Nf_0$, $Nr_0$ are stored in the storage 70a of FIG. 3 in advance as the specification information.

As shown in FIG. 10, when the motorcycle 100 is travelling, the vertical load Nf is applied from the front wheel 14 to the ground surface, and the vertical load Nr is applied from the rear wheel 82 to the ground surface. The vertical load Nf is expressed by a following formula (6), and the vertical load Nr is expressed by a following formula (7).

$$Nf=Nf_0-F\cdot h/pt \qquad (6)$$

$$Nr=Nr_0+F\cdot h/pt \qquad (7)$$

In the formula (6) and the formula (7), F is the force in the vehicle front-and-rear direction Dx exerted on the motorcycle 100. The force F includes a driving force and a braking force. The vertical load calculator 75 of FIG. 3 calculates the force F based on the longitudinal acceleration $A_{sx}$ detected by the acceleration sensor 42, and calculates the vertical loads Nf, Nr based on the formula (6) and the formula (7).

The force F may be calculated based on the detection results acquired by the front wheel speed sensor 44, the rear wheel speed sensor 46 of FIG. 1 or the brake sensor (not shown) instead of being calculated based on the longitudinal acceleration $A_{sx}$.

A coefficient p1 of the above formula (3) is expressed by a following formula (8), and a coefficient p2 is expressed by a following formula (9). The coefficients p1, p2 of the above formula (3) are found by the formula (8) and the formula (9).

$$p1=pt\cdot Nr/(Nf+Nr) \qquad (8)$$

$$P2=pt-p1 \qquad (9)$$

Further, by the above formula (1) and the above formula (3), a following formula (10) and a following formula (11) hold:

$$Fyf = \frac{Iz\cdot r' + p2\cdot F_{total}}{p1+p2} \qquad (10)$$

$$Fyr = F_{total} - Fyf \qquad (11)$$

Each wheel lateral force calculator 76 of FIG. 3 calculates the lateral force Fyf of the front wheel 14 and the lateral force Fyr of the rear wheel 82 based on the formula (10) and the formula (11).

Figure 11:
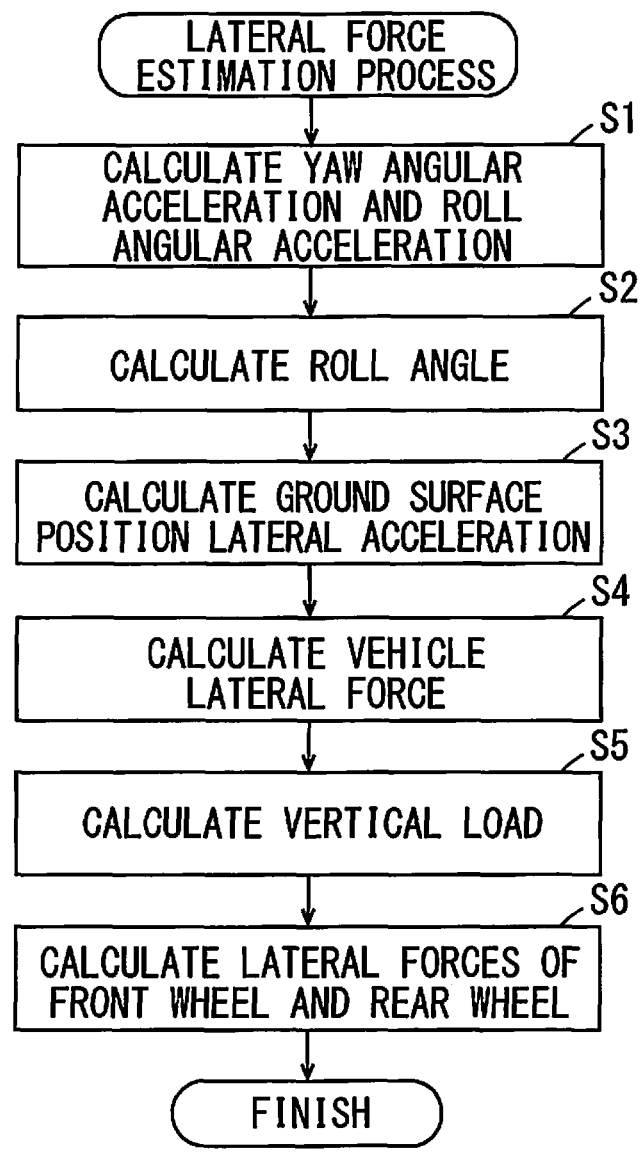
FIG. 11 is a flow chart of a lateral force estimation process.

The CPU of the controller 70 performs the lateral force estimation process based on a control program stored in the ROM. The lateral force estimation process by each function unit of FIG. 3 will be described below. FIG. 11 is a flow chart of the lateral force estimation process. The lateral force estimation process of FIG. 11 is repeatedly performed in a constant period during the travelling of the motorcycle 100.

As shown in FIG. 11, the angular acceleration calculator 71 first calculates the yaw angular acceleration r' and the roll angular acceleration φ" based on the yaw rate r and the roll rate φ' detected by the gyro sensor 41 (step S1). Further, the roll angle calculator 72 calculates the roll angle φ based on the roll rate φ' detected by the gyro sensor 41 (step S2).

Next, the Ay calculator 73 calculates the ground surface position lateral acceleration Ay based on the lateral acceleration $A_{sy}$ detected by the acceleration sensor 42, the yaw rate r and the roll rate φ' detected by the gyro sensor 41, the yaw angular acceleration r' and the roll angular acceleration φ" calculated by the angular acceleration calculator 71, the roll angle φ calculated by the roll angle calculator 72 and the specification information stored in the storage 70a (step S3).

Next, the vehicle lateral force calculator 74 calculates the vehicle lateral force $F_{total}$ based on the roll angular acceleration φ" calculated by the angular acceleration calculator 71, the roll angle φ calculated by the roll angle calculator 72, the ground surface position lateral acceleration Ay calculated by the Ay calculator 73 and the specification information stored in the storage 70a (step S4).

Then, the vertical load calculator 75 calculates the vertical loads Nf, Nr of the front wheel 14 and the rear wheel 82 based on the longitudinal acceleration $A_{sx}$ detected by the acceleration sensor 42 and the specification information stored in the storage 70a (step S5).

Each wheel lateral force calculator 76 calculates each of the lateral forces Fyf, Fyr of the front wheel 14 and the rear wheel 82 based on the yaw angular acceleration r' and the roll angular acceleration ϕ" calculated by the angular acceleration calculator 71, the vehicle lateral force $F_{total}$ calculated by the vehicle lateral force calculator 74, the vertical loads Nf, Nr calculated by the vertical load calculator 75 and the specification information stored in the storage 70a (step S6). Thus, the lateral force estimation process is finished.

The CPU of the controller 70 controls the hydraulic pressure controller 30 of FIG. 2 based on the vehicle lateral force $F_{total}$ or the lateral forces Fyf, Fyr of the front wheel 14 and the rear wheel 82 acquired by the lateral force estimation process. Thus, the braking forces of the front wheel 14 and the rear wheel 82 are adjusted.

For example, the larger the lateral forces Fyf, Fyr of the front wheel 14 and the rear wheel 82 are, the more likely the front wheel 14 and the rear wheel 82 are to slip. In this case, the hydraulic pressures supplied to the wheel cylinders WC1, WC2 (hereinafter referred to as a brake hydraulic pressure) are periodically increased and decreased in a constant range, so that the grip of the front wheel 14 and the rear wheel 82 is increased, and the slip of the front wheel 14 and the rear wheel 82 is prevented.

The hydraulic pressure controller 30 may be controlled based on the vehicle lateral force $F_{total}$ or the lateral forces Fyf, Fyr acquired by the lateral force estimation process such that the brake hydraulic pressure is periodically increased and decreased. Further, the hydraulic pressure controller 30 may be controlled such that a range or a speed of the change of the brake hydraulic pressure changes depending on the vehicle lateral force $F_{total}$ or the lateral forces Fyf, Fyr acquired by the lateral force estimation process. In this case, the grip of the front wheel 14 and the rear wheel 82 is more efficiently increased.

The vehicle lateral force $F_{total}$ is used for the control of the hydraulic pressure controller 30 so that a processing load of the controller 70 is decreased, and the braking force is quickly adjusted with respect to the change of the lateral forces of the front wheel 14 and the rear wheel 82. On the one hand, the lateral forces Fyf, Fyr are used for the control of the hydraulic pressure controller 30 so that each of the braking forces of the front wheel 14 and the rear wheel 82 are individually adjusted. Further, the control of the hydraulic pressure controller 30 may be performed using both of the vehicle lateral force $F_{total}$ and the lateral forces Fyf, Fyr. In this case, the braking force is more effectively adjusted.

In the lateral force estimation system according to the above-described preferred embodiments, the ground surface position lateral acceleration Ay preferably is calculated based on the lateral acceleration $A_{sy}$ detected by the acceleration sensor 42, the yaw rate r and the roll rate ϕ' detected by the gyro sensor 41, the yaw angular acceleration r' and the roll angular acceleration ϕ" calculated by the angular acceleration calculator 71, the roll angle ϕ calculated by the roll angle calculator 72, and the specification information stored in the storage 70a. Further, the vehicle lateral force $F_{total}$ is calculated based on the roll angular acceleration ϕ" calculated by the angular acceleration calculator 71, the roll angle ϕ calculated by the roll angle calculator 72, the ground surface position lateral acceleration Ay calculated by the Ay calculator 73, and the specification information stored in the storage 70a.

The ground surface position lateral acceleration Ay is not influenced by the properties of the front wheel 14 and the rear wheel 82 such as an air pressure and rubber properties of the tire and also is not influenced by a posture of a rider. Further, the ground surface position lateral acceleration Ay is based on dynamic conditions of the motorcycle 100 such as the yaw angular acceleration r' and the roll angular acceleration ϕ". Because the vehicle lateral force $F_{total}$ is calculated using the ground surface position lateral acceleration Ay, the vehicle lateral force $F_{total}$ is accurately estimated regardless of the properties of the front wheel 14 and the rear wheel 82, the posture of the rider and the dynamic conditions of the motorcycle 100. The travelling control of the motorcycle 100 is appropriately performed based on the estimated vehicle lateral force $F_{total}$. Further, because a special or expensive sensor or the like is not used, complications in the configuration and an increase of the cost are prevented.

Further, the lateral forces Fyf, Fyr of the front wheel 14 and the rear wheel 82 are respectively calculated based on the yaw angular acceleration r' and the roll angular acceleration ϕ" calculated by the angular acceleration calculator 71, the vehicle lateral force $F_{total}$ calculated by the vehicle lateral force calculator 74 and the vertical loads Nf, Nr calculated by the vertical load calculator 75. Thus, the lateral forces Fyf, Fyr of the front wheel 14 and the rear wheel 82 are accurately estimated with a simple configuration. Further, the travelling control of the motorcycle 100 is appropriately performed based on the estimated lateral forces Fyf, Fyr of the front wheel 14 and the rear wheel 82.

The vehicle lateral force $F_{total}$ and the lateral forces Fyf, Fyr are preferably corrected based on the steering angle detected by the steering angle sensor 45 of FIG. 1. The correction of the vehicle lateral force $F_{total}$ and the lateral forces Fyf, Fyr based on the steering angle will be described below.

Figure 12:
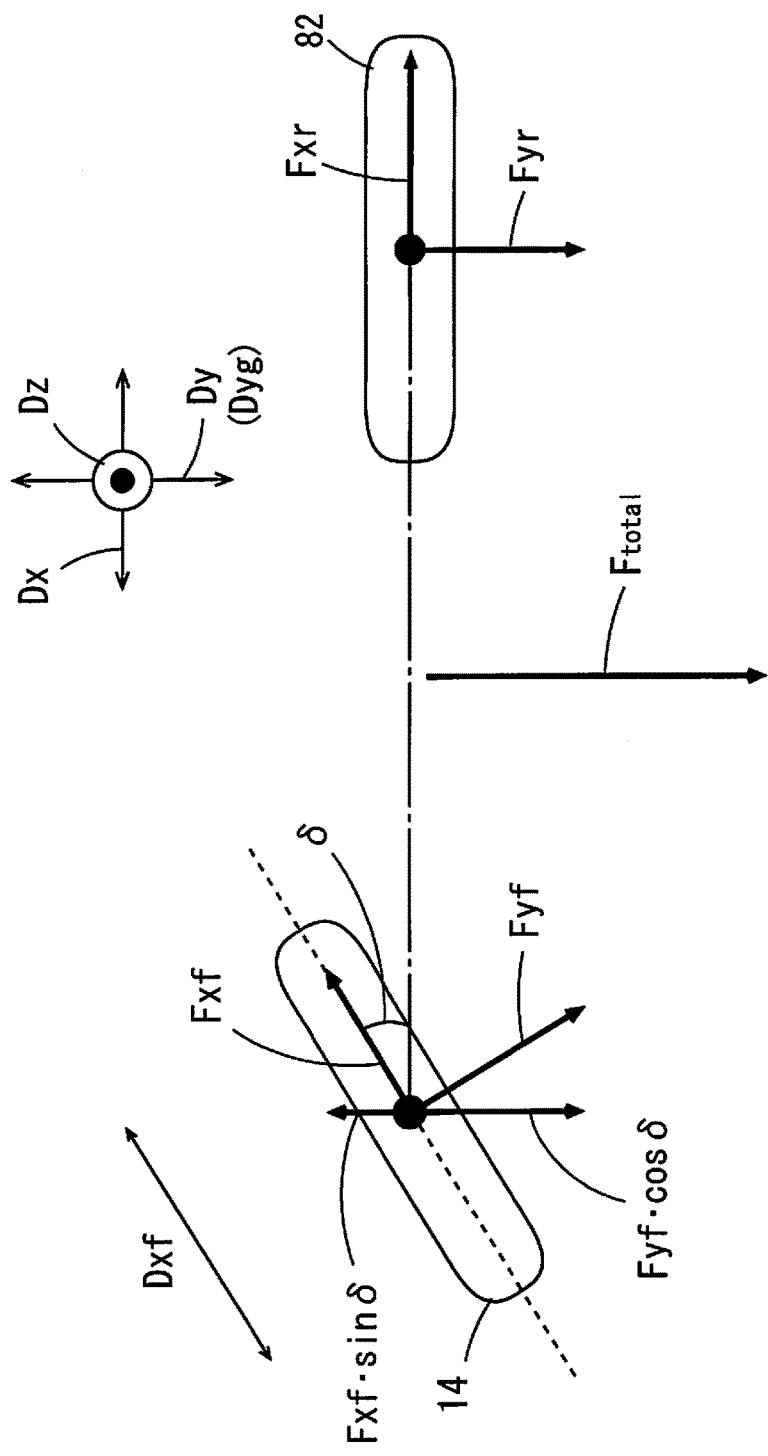
FIG. 12 is a diagram for explaining correction of the vehicle lateral force based on a steering angle.

FIG. 12 is a diagram for explaining the correction of the vehicle lateral force $F_{total}$ based on the steering angle. In FIG. 12, the steering angle of the motorcycle 100 is δ. The steering angle δ is equivalent to an angle defined by the front wheel front-and-rear direction Dxf and the vehicle front-and-rear direction Dx. As described above, the vehicle lateral force $F_{total}$ is the sum of components of the lateral forces of the front wheel 14 and the rear wheel 82 exerted in the ground surface lateral direction Dyg. Therefore, in the example of FIG. 12, the vehicle lateral force $F_{total}$ is expressed by a following formula (12).

$$F_{total} = Fyf \cdot \cos \delta + Fyr \quad (12)$$

Further, forces (longitudinal forces) Fxf, Fxr in the front wheel front-and-rear direction Dxf and the rear wheel front-and-rear direction Dxr are respectively exerted on the front wheel 14 and the rear wheel 82 in addition to the above-described lateral forces Fyf, Fyr. The longitudinal force Fxr of the rear wheel 82 is exerted in a direction perpendicular or substantially perpendicular to the ground surface lateral direction Dyg, thus not including a component in the ground surface lateral direction Dyg. On the other hand, the longitudinal force Fxf of the front wheel 14 includes a component in the ground surface lateral direction Dyg that depends on the steering angle δ. The component in the ground surface lateral direction Dyg of the longitudinal force Fxf is indicated by Fxf·sin δ. Therefore, a following formula (13) holds as a relationship among the forces exerted in the ground surface lateral direction Dyg. In the following formula (13), Fxf is a negative value.

$$F_{total} + Fxf \sin \delta = m \cdot Ay + m \cdot h \cdot \phi'' / \cos \phi \quad (13)$$

The vehicle lateral force calculator 74 of FIG. 3 calculates the vehicle lateral force $F_{total}$ based on the formula (13) instead of the above formula (2).

Further, a relationship between the yaw moment exerted on the motorcycle 100 and the forces exerted on the front wheel 14 and the rear wheel 82 is expressed by a following formula (14).

$$Iz \cdot r' = p1 \cdot Fyf \cos \delta - p2 \cdot Fyr + p1 \cdot Fxf \sin \delta \quad (14)$$

From the formula (13) and the formula (14), a following formula (15) and a following formula (16) hold:

$$Fyf = \frac{Iz \cdot r' - p1 \cdot Fx \cdot \sin\delta + p2 \cdot F_{total}}{(p1 + p2) \cdot \cos\delta} \quad (15)$$

$$Fyr = F_{total} - Fyf \cdot \cos\delta \quad (16)$$

Each wheel lateral force calculator 76 of FIG. 3 calculates the lateral forces Fyf, Fyr of the front wheel 14 and the rear wheel 82 based on the formula (15) and the formula (16).

In this manner, the vehicle lateral force $F_{total}$ and the lateral forces Fyf, Fyr are calculated based on the steering angle δ detected by the steering angle sensor 45, so that the more accurate vehicle lateral force $F_{total}$ and lateral forces Fyf, Fyr are acquired. In particular, when the motorcycle 100 turns with the braking force or the driving force being exerted on the front wheel 14, which is the steering wheel, accuracy of the calculated vehicle lateral force $F_{total}$ and lateral forces Fyf, Fyr is improved.

Figure 13:
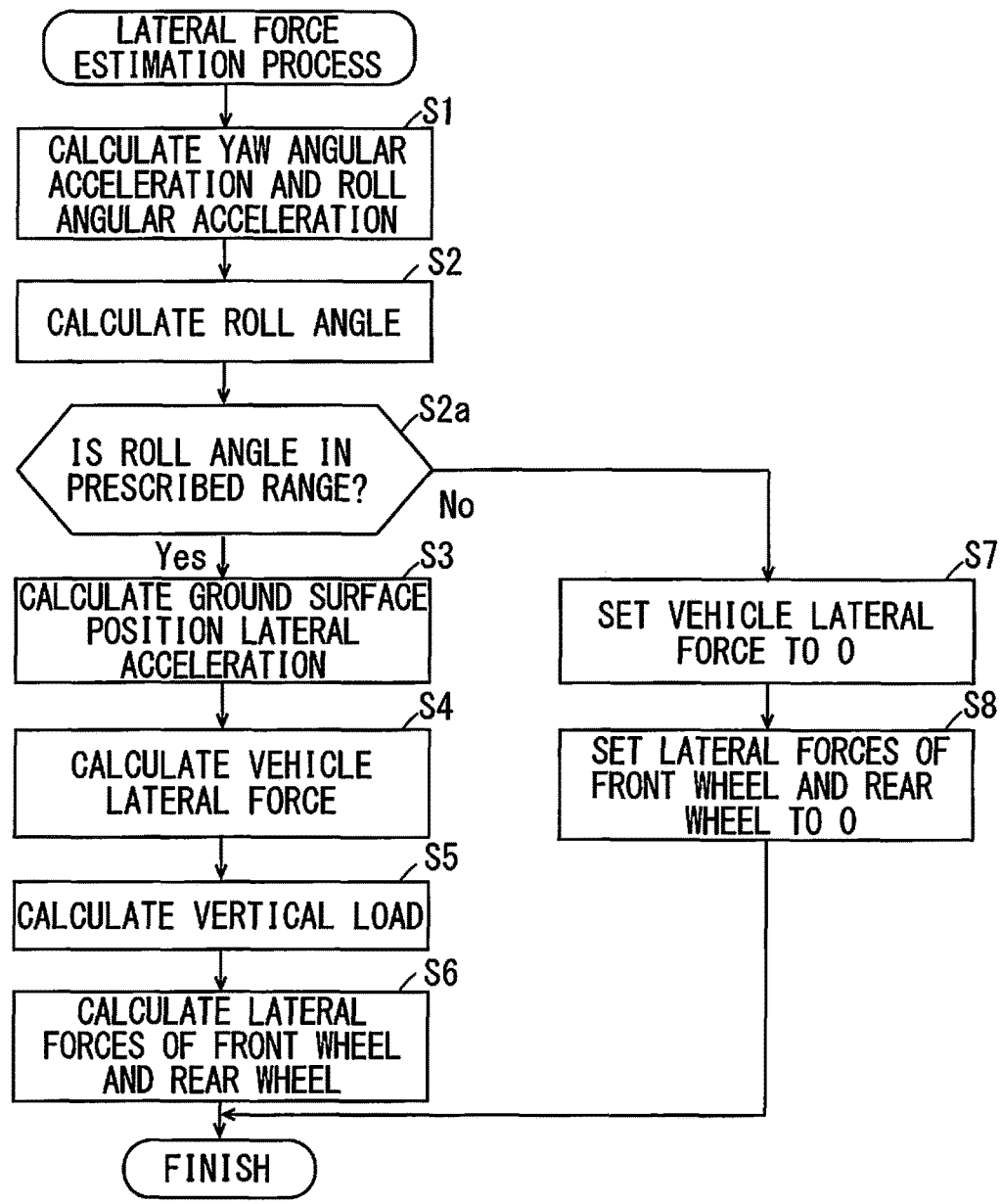
FIG. 13 is a flow chart of another example of the lateral force estimation process.
Figure 14:
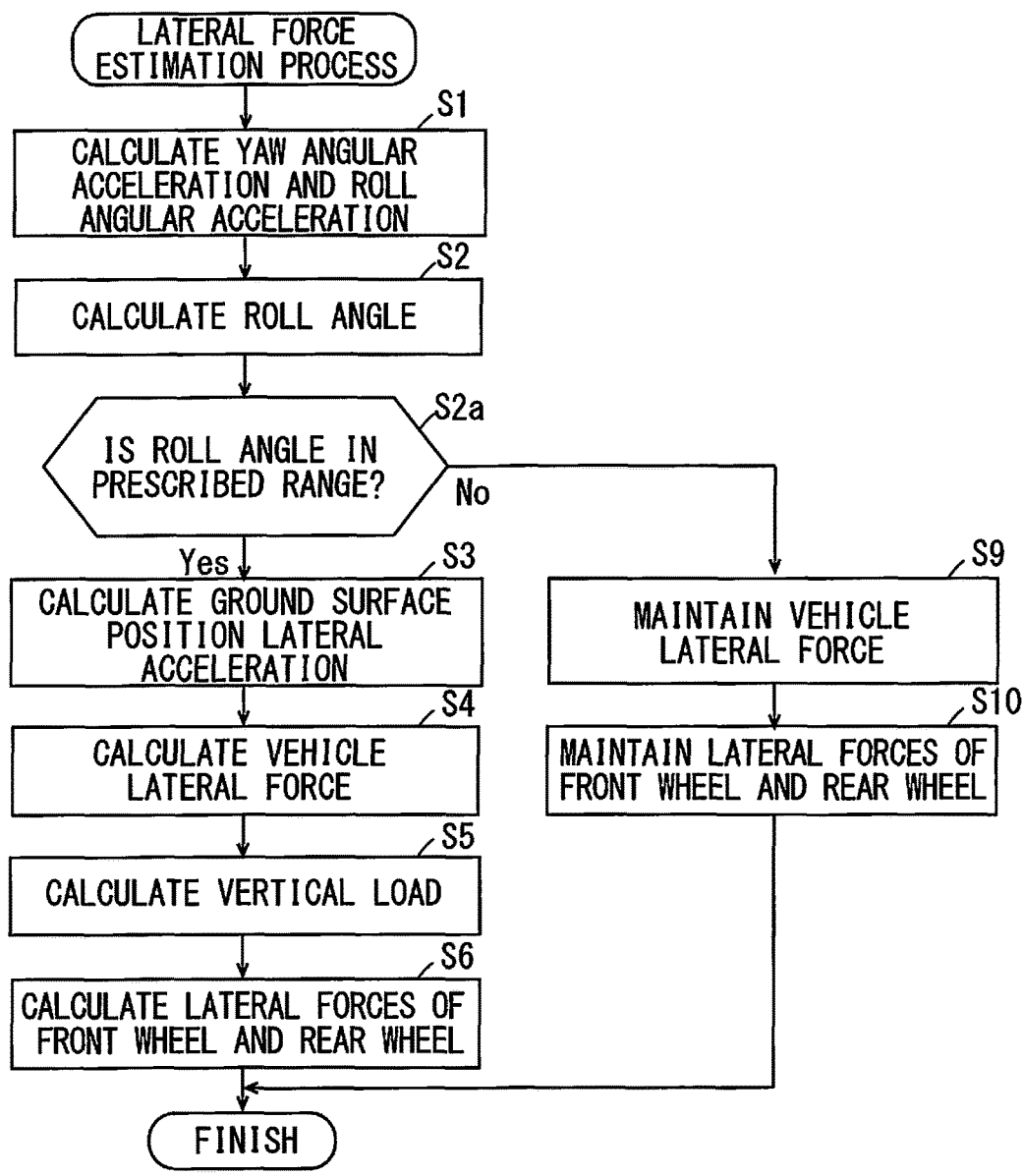
FIG. 14 is a flow chart of another example of the lateral force estimation process.

FIGS. 13 and 14 are flow charts of other examples of the lateral force estimation process. Regarding the examples of FIGS. 13 and 14, differences from the example of FIG. 11 will be described.

In the example of FIG. 13, the roll angle calculator 72 determines whether the calculated roll angle is in a prescribed range after calculating the roll angle in the step S2 (step S2a). The prescribed range preferably is not less than about −30° and not more than about 30°, for example. When the calculated roll angle is in the prescribed range, the processes of the steps S3 to S6 are performed similarly to the example of FIG. 11. When the calculated roll angle is not in the prescribed range, the vehicle lateral force calculator 74 sets the vehicle lateral force $F_{total}$ to 0 (step S7). Further, each wheel lateral force calculator 76 sets the lateral forces Fyf, Fyr of the front wheel 14 and the rear wheel 82 to 0 (step S8). Thus, the lateral force estimation process is finished.

When the motorcycle 100 is performing normal travelling, the roll angle is in the prescribed range. On the one hand, when the motorcycle 100 falls over, the roll angle is out of the prescribed range. When the vehicle lateral force $F_{total}$ and the lateral forces Fyf, Fyr are calculated based on the actual roll angle during falling, the vehicle lateral force $F_{total}$ and the lateral forces Fyf, Fyr become significantly large. When the hydraulic pressure controller 30 is controlled based on the vehicle lateral force $F_{total}$ and the lateral forces Fyf, Fyr, the braking forces of the front wheel 14 and the rear wheel 82 largely fluctuate. However, the necessity of adjustment of the braking force during falling is low.

In the example of FIG. 13, the vehicle lateral force $F_{total}$ and the lateral forces Fyf, Fyr are set to 0 during falling of the motorcycle 100. Thus, the adjustment of the unnecessary braking force during falling of the motorcycle 100 is prevented.

In the example of FIG. 14, similarly to the example of FIG. 13, the roll angle calculator 72 determines whether the calculated roll angle is in the prescribed range after calculating the roll angle in the step S2 (step S2a). When the calculated roll angle is in the prescribed range, the processes of the steps S3 to S6 are performed similarly to the example of FIG. 11. When the calculated roll angle is not in the prescribed range, the vehicle lateral force calculator 74 maintains the vehicle lateral force $F_{total}$ at the value calculated in the previous period (step S9). Further, each wheel lateral force calculator 76 maintains the lateral forces Fyf, Fyr of the front wheel 14 and the rear wheel 82 at the calculated values calculated in the previous period (step S10). Thus, the lateral force estimation process is finished.

In the example of FIG. 14, during falling of the motorcycle 100, the vehicle lateral force $F_{total}$ and the lateral forces Fyf, Fyr are maintained at the values calculated in the previous period. The values calculated in the previous period are the values right before the roll angle is out of the prescribed range. Even in this case, similarly to the example of FIG. 13, unnecessary adjustment of the braking force during falling of the motorcycle 100 is prevented.

While the vehicle lateral force $F_{total}$ and the lateral forces Fyf, Fyr of the front wheel 14 and the rear wheel 82 are preferably calculated using the mass m of the motorcycle 100, the position of the center of gravity G, and the inertia Ir in the above-described preferred embodiments, the present invention is not limited to this. The vehicle lateral force $F_{total}$ and the lateral forces Fyf, Fyr of the front wheel 14 and the rear wheel 82 may be calculated using the mass, the position of the center of gravity, and the inertia of the entirety of the motorcycle 100, rider, and the loaded object.

In this case, the rider and the loaded object may be averagely assumed to determine the mass, the position of the center of gravity and the inertia of the entirety in advance, and these may be stored in the storage 70a in advance as the specification information. Alternatively, the information regarding the rider and the loads may be externally entered, and the mass, the position of the center of gravity and the inertia of the entirety may be calculated based on the information regarding the motorcycle 100 stored in advance and the entered information regarding the rider and the loaded object.

While the hydraulic pressures supplied from the hydraulic pressure controller 30 to the wheel cylinders WC1, WC2 are preferably adjusted based on the vehicle lateral force $F_{total}$ or the lateral forces Fyf, Fyr in the above-described preferred embodiments, the present invention is not limited to this. Another travelling control of the motorcycle 100 may be performed based on the vehicle lateral force $F_{total}$ or the lateral forces Fyf, Fyr. For example, the ignition timing in the engine 17 is adjusted so that the generated driving force is adjusted.

While the lateral forces Fyf, Fyr of the front wheel 14 and the rear wheel 82 are preferably calculated based on the vehicle lateral force $F_{total}$ in the above-described preferred embodiments, the present invention is not limited to this. When the travelling control of the motorcycle 100 is performed using only the vehicle lateral force $F_{total}$, the lateral forces Fyf, Fyr do not have to be calculated.

While the above-described preferred embodiments are examples in which the present invention is preferably applied to the motorcycle, the present invention is not limited to this. The present invention may be applied to another straddle-type vehicle such as a motor tricycle or an ATV (All Terrain Vehicle) or another vehicle.

While the above-described preferred embodiments are examples in which the present invention is applied to a vehicle including an engine as a motor, the present invention is not limited to this. The present invention may be applied to a motor vehicle including an electric motor as a motor.

In the following paragraphs, non-limiting examples of correspondence between various elements recited in the claims below and those described above with respect to various preferred embodiments of the present invention are explained.

In the above-described preferred embodiments, the acceleration sensor 42 is an example of a lateral acceleration detector, the angular acceleration calculator 71 is an example of a roll angular acceleration detector and a yaw angular acceleration detector, the roll angle calculator 72 is an example of a roll angle detector, the storage 70a is an example of a storage, the Ay calculator 73 is an example of a ground surface position lateral acceleration calculator, and the vehicle lateral force calculator 74 is an example of a vehicle lateral force calculator.

Further, the steering angle sensor 45 is an example of a steering angle detector, the vertical load calculator 75 is an example of a load calculator, each wheel lateral force calculator 76 is an example of a lateral force calculator, the body frame 11 is an example of a main body, the engine 17 is an example of a motor, and the motorcycle 100 is an example of a vehicle.

As each of constituent elements recited in the claims, various other elements having configurations or functions described in the claims can be also used.

Preferred embodiments of the present invention may be effectively utilized for various types of vehicles that turn in a tilted posture with respect to a ground surface.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A lateral force estimation system for a vehicle that includes a plurality of wheels and turns in a tilted posture with respect to a ground surface, the lateral force estimation system comprising:
a lateral acceleration detector that detects lateral acceleration at a predetermined position of the vehicle;
a roll angular acceleration detector that detects roll angular acceleration of the vehicle;
a yaw angular acceleration detector that detects yaw angular acceleration of the vehicle;
a roll angle detector that detects a roll angle of the vehicle;
a storage that stores a position of a center of gravity of the vehicle and a mass of the vehicle;
a ground surface position lateral acceleration calculator that calculates acceleration exerted in a direction perpendicular or substantially perpendicular to a front-and-rear direction of the vehicle and parallel or substantially parallel to a ground surface at an intersection position of a straight line passing through the center of gravity of the vehicle and parallel or substantially parallel to a top-and-bottom direction of the vehicle with the ground surface as a ground surface position lateral acceleration based on the lateral acceleration detected by the lateral acceleration detector, the roll angular acceleration detected by the roll angular acceleration detector, the yaw angular acceleration detected by the yaw angular acceleration detector, the roll angle detected by the roll angle detector, and the position of the center of gravity of the vehicle stored in the storage; and
a vehicle lateral force calculator that calculates a sum of lateral forces exerted on the plurality of wheels as a vehicle lateral force based on the roll angle detected by the roll angle detector, the roll angular acceleration detected by the roll angular acceleration detector, the position of the center of gravity and the mass of the vehicle stored in the storage, and the ground surface position lateral acceleration calculated by the ground surface position lateral acceleration calculator.

2. The lateral force estimation system according to claim 1, wherein, when the roll angle is $\phi$, the roll angular acceleration is $\phi''$, a distance between the position of the center of gravity and the intersection position is h, the ground surface position lateral acceleration is Ay, and the vehicle lateral force is $F_{total}$, the vehicle lateral force calculator calculates a vehicle lateral force $F_{total}$ using a following formula (1):

$$F_{total} = m \cdot Ay + m \cdot h \cdot \phi'' / \cos \phi \qquad (1).$$

3. The lateral force estimation system according to claim 1, further comprising a steering angle detector that detects a steering angle of the vehicle; wherein
the vehicle lateral force calculator corrects a calculated vehicle lateral force based on the steering angle detected by the steering angle detector.

4. The lateral force estimation system according to claim 1, further comprising:
a load calculator that calculates a load applied from each of the plurality of wheels to the ground surface; and
a lateral force calculator that calculates a lateral force exerted on each of the plurality of wheels based on the yaw angular acceleration detected by the yaw angular acceleration detector, the vehicle lateral force calculated by the vehicle lateral force calculator, and the load calculated by the load calculator.

5. The lateral force estimation system according to claim 1, wherein the vehicle lateral force calculator sets the vehicle lateral force to 0 when the roll angle detected by the roll angle detector is not within a predetermined range.

6. The lateral force estimation system according to claim 1, wherein the vehicle lateral force calculator periodically calculates the vehicle lateral force, and maintains the vehicle lateral force calculated in a previous period when the roll angle detected by the roll angle detector is not within a predetermined range.

7. A vehicle comprising:
a main body including a plurality of wheels;
a motor that generates a driving force to move the main body; and
the lateral force estimation system according to claim 1.

8. A method of estimating a lateral force exerted on a vehicle that includes a plurality of wheels and turns in a tilted posture with respect to a ground surface, the method comprising the steps of:
storing a position of a center of gravity of the vehicle and a mass of the vehicle;
detecting lateral acceleration at a predetermined position of the vehicle;
detecting roll angular acceleration of the vehicle;
detecting yaw angular acceleration of the vehicle;
detecting a roll angle of the vehicle;

calculating acceleration exerted in a direction perpendicular or substantially perpendicular to a front-and-rear direction of the vehicle and parallel or substantially parallel to a ground surface at an intersection position of a straight line passing through a center of gravity of the vehicle and parallel or substantially parallel to a top-and-bottom direction of the vehicle with the ground surface as a ground surface position lateral acceleration based on the detected lateral acceleration, roll angular acceleration, yaw angular acceleration, and roll angle and the stored position of the center of gravity of the vehicle; and calculating a sum of lateral forces exerted on the plurality of wheels as a vehicle lateral force based on the detected roll angle and roll angular acceleration, the stored position of the center of gravity and the mass of the vehicle, and the calculated ground surface position lateral acceleration.

* * * * *